Figure 1:
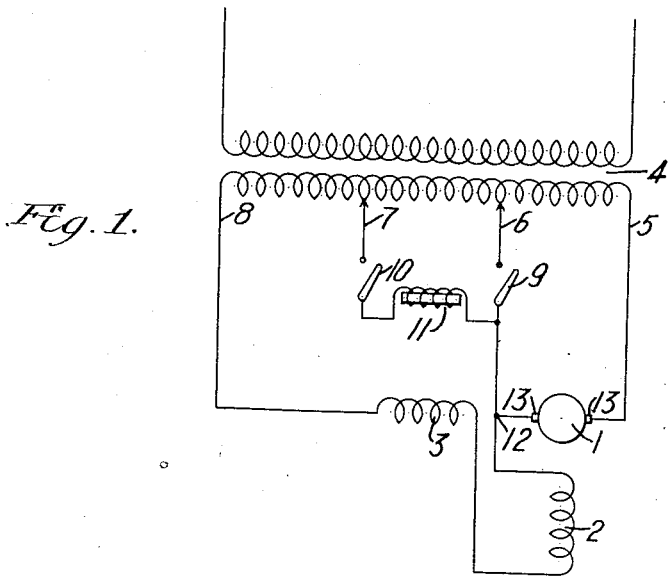

R. E. HELLMUND.
SYSTEM OF CONTROL.
APPLICATION FILED SEPT. 8, 1914.

1,300,387.

Patented Apr. 15, 1919.
2 SHEETS—SHEET 1.

WITNESSES:
Fred. A. Lind.
J. C. Davis.

INVENTOR
Rudolf E. Hellmund
BY
ATTORNEY

R. E. HELLMUND.
SYSTEM OF CONTROL.
APPLICATION FILED SEPT. 8, 1914.

1,300,387.

Patented Apr. 15, 1919.
2 SHEETS—SHEET 2.

WITNESSES:

INVENTOR
Rudolf E. Hellmund
BY
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,300,387. Specification of Letters Patent. Patented Apr. 15, 1919.

Application filed September 8, 1914. Serial No. 860,611.

*To all whom it may concern:*

Be it known that I, RUDOLF E. HELLMUND, a subject of the Emperor of Germany, and a resident of Pittsburgh, in the county of Allegheny and State of Pennsylvania, have invented a new and useful Improvement in Systems of Control, of which the following is a specification.

My invention relates to alternating-current motors of the series commutating type, and it has for its object to provide means whereby the speed of a motor of the character specified may be controlled in a simple and effective manner and, at the same time, the commutating reactance voltage may be substantially neutralized at all speeds, and commutator sparking eliminated.

In the operation of alternating-current motors of the series commutating type, it is common to control the speed of rotation of the armature by supplying the armature winding with current from two sources, namely, by induction from a cross field winding and by direct flow from the source through an intermediate connection. The various amounts of current supplied by these two agencies may be varied by moving the point of connection between each of them and the source.

In order to avoid opening the current-supply circuit of a motor when changing the speed therefor, it is customary to make connection to the higher-voltage point before connection is broken with the low-voltage point, the two points of connection being connected, for the time being, through a preventive device embodying either resistance or reactance in order to prevent short circuiting of a portion of the source. By my invention I employ preventive devices of the reactive type and allow them to remain in circuit when connection is made to such portions of the source as are employed for armature supply at high running speeds.

When a motor of the type specified is operating at low speeds, the power factor of the armature circuit is low so that there is a component of the armature current opposed to the current induced in the short circuited armature windings by the cross field winding during the process of commutation. As the speed of the motor is increased, the power factor of the armature circuit improves and the neutralization ceases to exist, in consequence of which serious commutator sparking may ensue. By leaving a preventive device of the reactive type in series with the armature when the latter is running at high speed, the power factor of the armature circuit may be lowered to any desired extent in order to insure the neutralization of the above noted reactance commutating voltage under all conditions.

Figure 2:
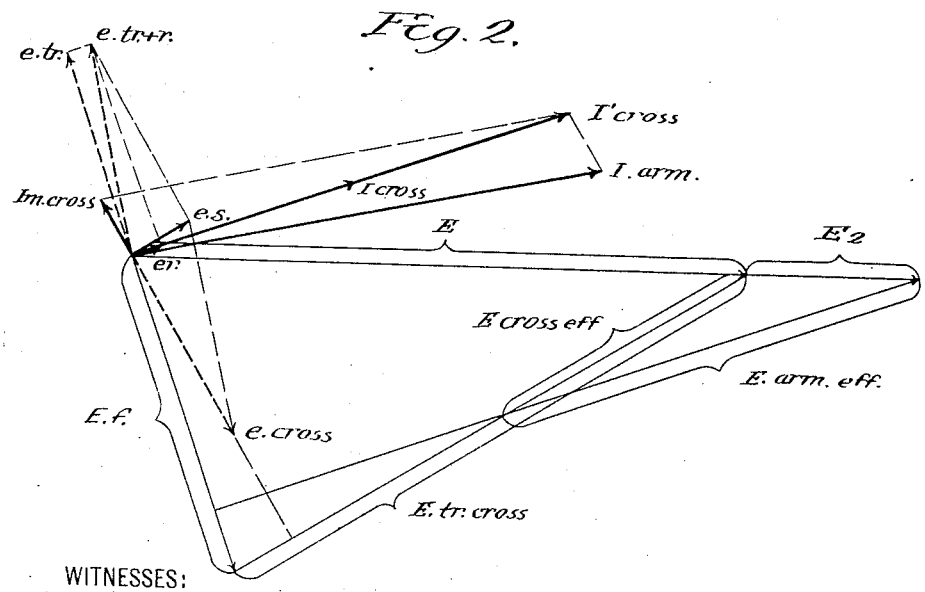
Figure 3:
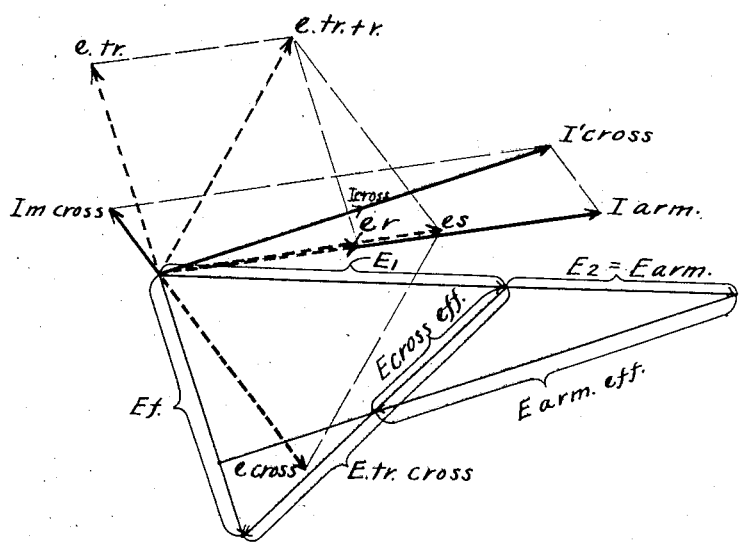
Figure 4:
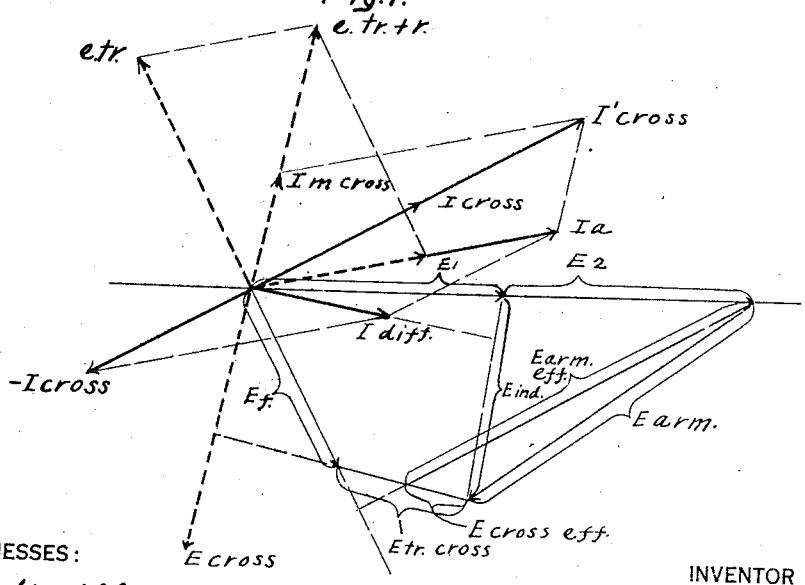

Figure 1 of the accompanying drawing is a diagrammatic view of an alternating-current motor of the series commutating type, together with its attendant control circuits, embodying my invention; and Figs. 2, 3 and 4 are vector diagrams illustrating the operation of the system of Fig. 1.

An armature 1 is provided with a main field winding 2 and with a cross field winding 3, energized from any suitable source of alternating current such, for example, as a transformer 4. The secondary winding of the transformer 4 is provided with any desired number of voltage taps, such, for example, as 5, 6, 7, and 8. I prefer to provide the cross field winding 3 with more turns than the armature 1 so that the current flowing in the armature 1 will be greater than that flowing in the cross field winding 3. At starting, a switch 9 is closed so that the two field windings 2 and 3 are connected in series relation with each other and with the armature winding 1. A connection is made from the armature 1, through the tap 6, to a point in the source of such potential that current will flow therefrom to the armature. The armature current divides at the junction point 12, a portion of it flowing through the windings 2 and 3 and another portion thereof flowing through the taps 6 and a portion of the source. If desired, I may provide the cross field winding 3 with fewer turns than the armature 1, whereupon the current flow through the field windings will be greater than that through the armature, and the field current will divide at the point 12, a portion thereof flowing to the source through the tap 6 and the remainder flowing through the armature winding.

With the above connections made as noted, the armature 1 will rotate at low speed and the coils thereof that are short circuited by the brushes 13 will have induced therein a rotational electromotive force by the field of the winding 3. At low speed, however, the power factor of the motor is necessarily somewhat low, and there will be a component of the armature voltage which is opposed to the electromotive force induced in the short circuited coils. There will accordingly be a neutralization of current in these coils of such magnitude that little difficulty will be experienced from sparking.

In order to increase the speed of the armature 1, it is desirable to increase the current flow therethrough though I prefer to accomplish this result by increasing the voltage impressed upon the armature circuit. I, accordingly, close a switch 10 so that connection is made between the taps 6 and 7 through a reactive device 11 which prevents the short circuiting of the portion of the source included between the taps 6 and 7. The switch 9 is next opened, whereupon the point 12 is connected to the tap 7 through the reactance device 11 which is left in circuit, and the voltage applied to the armature is increased from its former value. The armature then tends to rotate at higher speed and also tends to improve its power factor. As a result, there would cease to be a neutralization of the reactance commutating voltage and serious sparking at the brushes would ensue. By leaving the reactance device 11 in circuit, however, the power factor of the armature circuit may be maintained to such a low value that there will be a suitable component of the armature voltage to oppose the reactance commutating voltage and prevent sparking.

The attached Fig. 2 is a vector diagram for a doubly-fed motor running at relatively low speeds and without an inductance in the middle tap. $I_{arm}$ represents the armature current; $I'_{cross}$ represents the cross field current reduced to the armature circuit; $Im_{cross}$, the cross field magnetizing current also reduced to the armature circuit. $E_f$ is the inductive voltage on the field which is at right angles to $I'_{cross}$; $E_1$ is the voltage impressed upon the cross field circuit; $E_2$ is the voltage impressed upon the armature circuit. $E_{tr-cross}$ is the voltage which is induced by transformer action from the cross field circuit into the armature. Assuming a transformer ratio of 1 to 2, half of this voltage $E_{cross-eff}$, appears in the armature and produces, with the voltage $E_2$, the effective armature voltage $E_{arm-eff}$. This voltage is at right angles to the field voltage $E_f$ and parallel to the cross field current which excites the main field. The vector $e_{tr}$, at right angles to $I_{cross}$, represents the transformer sparking voltage; $e_r$ represents the reactance voltage which is in phase with the armature current. These two sparking voltages combine to produce a voltage $e_{tr+r}$ which is counterbalanced by a voltage induced in the short-circuited coil by rotation in the cross field represented by the vector $e_{cross}$. By combining said voltage with the other commutation voltages, we obtain $e_s$ as the resultant sparking voltage. In this particular case, this voltage is very small and will not cause any undue arcing, because the reactance sparking voltage is rather low on account of the low speed. The drops due to ohmic resistance, etc., are neglected as they do not radically modify the diagram and serve only to confuse the showing.

Fig. 3 shows a diagram which is in principle the same as that of Fig. 2 except that the voltage $E_1$ has been decreased and $E_2$ increased in order to provide an increase of motor speed. At the same time, the reactance voltage $e_r$ has been increased materially on account of the greater speed. As a result, the sparking voltage $e_s$ is very large and produces harmful sparking.

Fig. 4 shows how, by the introduction of the inductance 11 of Fig. 1, at high speeds, the resultant sparking voltage is reduced to zero. $I_{diff}$ represents the current flowing in the inductance, being the difference between the armature current and the current $I_{cross}$ flowing in the cross field circuit. The vector $E_{ind}$ represents the voltage in the inductance at right angles to the current in the same. It will be noted that the vectors $e_{cross}$ and $e_{tr+r}$ are equal and opposite to each other and that, therefore, the motor is fully neutralized for commutation.

Thus, with the very simple control arrangement shown in Fig. 1, comprising only two switches and an inductive device, it is possible to accomplish speed regulation without opening the motor circuit, by using the inductive device as a transition device. It is, moreover, possible to provide good commutation for low-speed as well as high-speed connection in an extremely simple manner.

Obviously, my invention is capable of extension over a wide range of speed control, as the voltage of the armature may be increased by the use of several distinct taps, with each of which is associated a suitable reactance preventive device, the essential condition being that the higher the voltage applied to the armature, with a given main and cross field strength, the greater is the amount of reactance inserted in series with the armature winding.

My system of preventing sparking and short circuiting of the source may, if desired, be combined with other methods of speed control such, for example, as varying the strength of the fields 2 and 3, but I do not consider that such combinations affect the principle of my invention, they being merely aggregations of distinct principles.

Many modifications of my invention will occur to those skilled in the art, and I accordingly do not desire to be restricted to the specific embodiments disclosed but desire that only such restrictions shall be placed upon my invention as are set forth in the appended claims.

I claim as my invention:

1. The combination with an alternating-current motor of the commutating type provided with an armature winding and a cross-field winding, of a source of alternating current, means for connecting said armature and cross-field windings in series-circuit relation across said source, a connection from a point in said series circuit between said armature and cross-field windings to a point in said source, a second connection including a reactance device that may be established between said point in the series circuit and a point of different potential than the first-named point in said source, and single switching means for interrupting said first-named connection and for simultaneously rendering said last named connection, including said reactive device, effective upon the motor circuit.

2. The combination with an alternating-current motor of the commutating type provided with an armature winding and a cross-field winding, of a source of alternating current, means for connecting said armature and cross-field windings in series-circuit relation across said source, a connection from a point in said series circuit between said armature and cross-field windings to a point in said source, and switching means for simultaneously changing this connection to another point in the source and for increasing the effective reactance of said connection.

In testimony whereof, I have hereunto subscribed my name this 31st day of Aug. 1914.

RUDOLF E. HELLMUND.

Witnesses:
 JOHN S. DEAN,
 B. B. HINES.

Copies of this patent may be obtained for five cents each, by addressing the "Commissioner of Patents Washington, D. C."